Figure 1:
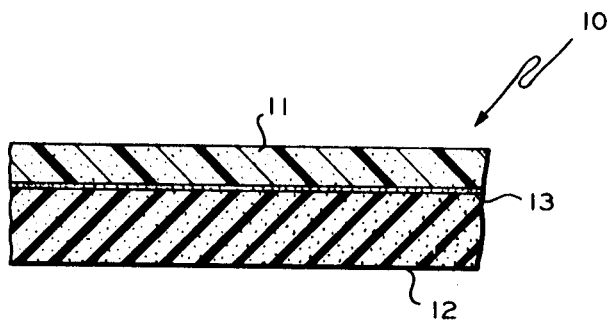

United States Patent

[11] 3,607,601

| [72] | Inventors | Paul B. Milam, Jr.;<br>Nolan J. Edmunds, both of Bartlesville, Okla. |
|---|---|---|
| [21] | Appl. No. | 750,342 |
| [22] | Filed | Aug. 5, 1968 |
| [45] | Patented | Sept. 21, 1971 |
| [73] | Assignee | Phillips Petroleum Company |

[54] FOAMED SHOCK-ABSORBENT STRUCTURE
12 Claims, 2 Drawing Figs.

[52] U.S. Cl. .................................................. 161/159,
161/160, 161/165, 161/190, 161/252, 161/253,
161/254, 264/46
[51] Int. Cl. ...................................................... B32b 3/12,
B32b 7/02, B32b 7/08
[50] Field of Search ............................................ 161/159,
160, 161, 190, 162, 252, 253, 254, 165; 264/46,
321

[56] References Cited
UNITED STATES PATENTS

| 2,878,153 | 3/1959 | Hacklander ................. | 161/159 |
| 3,108,852 | 10/1963 | Olsen .......................... | 161/161 |
| 3,411,967 | 11/1968 | Rowland et al. .............. | 161/161 |

*Primary Examiner*—William J. Van Balen
*Attorney*—Young and Quigg

ABSTRACT: A shock-absorbent structure comprises a first foamed layer of a normally solid synthetic thermoplastic polymeric material, for example polyethylene, having a compressive strength at 10 percent deflection in the range of about 30 to about 200, and a second underlying layer of a flexible cellular rubber, for example flexible polyurethane.

PATENTED SEP 21 1971　　　　　　　　　　　　　　　　3,607,601

INVENTORS
P. B. MILAM, JR.
N. J. EDMUNDS
BY
*Young & Quigg*
ATTORNEYS

FOAMED SHOCK-ABSORBENT STRUCTURE

This invention relates to shock-absorbent structures. In one aspect the invention relates to an improved shock-absorbent construction of foamed materials.

Difficulties have been encountered with structures such as athletic padding components in that the rigid components are subject to cracking or even shattering with severe impact loads. Furthermore, the rigid components do not spread the impact load as much as would be desirable. Increasing the thickness of the padding results in an undesirable increase in weight.

Accordingly, it is an object of the invention to provide an improved shock-absorbent structure. Another object of the invention is to provide a greater shock-absorbing capacity for a given amount of weight. Another object of the invention is to provide an improved shock-absorbing structure which is resistant to cracking or shattering with sharp impact loads. Yet another object of the invention is to provide a shock-absorbent structure which diffuses an impact load over a larger area.

Other objects, aspects and advantages of the invention will be apparent from a study of the specification, the drawings and the appended claims to the invention.

Figure 2:
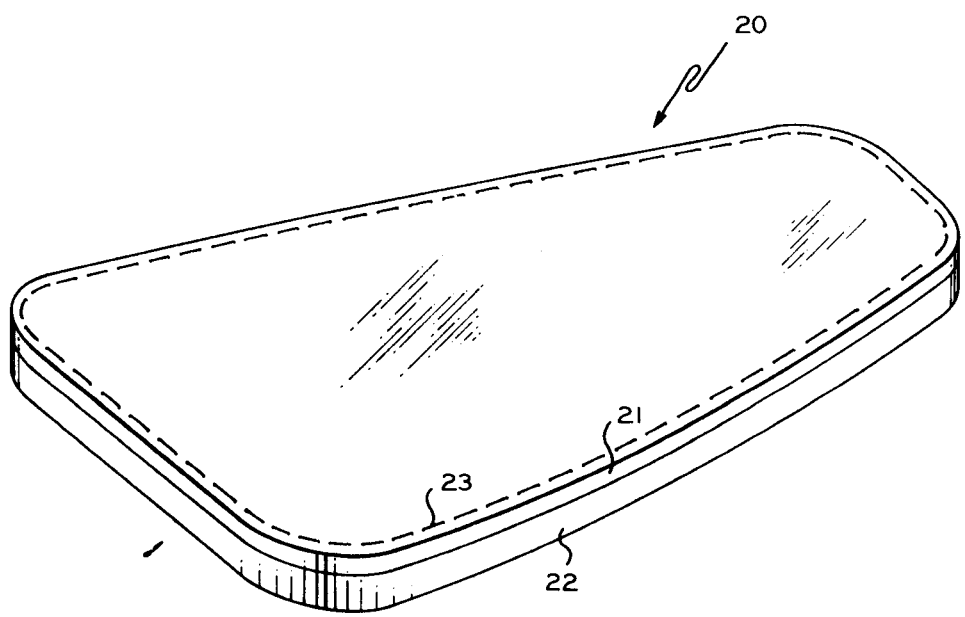

In the drawings,

FIG. 1 is a cross-sectional view of a shock-absorbent structure in accordance with one embodiment of the invention, and FIG. 2 is a perspective view of a shock-absorbent structure in accordance with a second embodiment of the invention.

According to the invention, there is provided a shock-absorbent structure comprising a first foamed layer of a foamable, normally solid, synthetic thermoplastic polymeric material having a compressive strength at 10 percent deflection (ASTM D1621–64T, Procedure A) in the range of about 30 to about 200 p.s.i.; and a second, underlying layer of flexible cellular rubber having a compressive strength at 25 percent deflection (ASTM D1055–62T, indentation test, for latex foam rubber; ASTM D1056–62T, compression-deflection test for sponge rubber and expanded rubber) in the range of about 1 to about 30 p.s.i. The first layer acts to distribute the impact load over a wider area as well as absorbing a portion of the impact load. The second layer provides additional absorption of the transmitted load.

While the first layer can be made of any suitable material, homopolymers of ethylene and copolymers of ethylene and at least one monomer copolymerizable therewith are presently preferred. Suitable comonomers include 1-olefins having 3 to 10 carbon atoms, for example propylene, butene-1, hexene-1, decene-1; vinyl esters, for example vinyl acetate, vinyl propionate, vinyl butyrate; vinyl ethers; divinyl ethers; acrylic acid; esters of acrylic acid and methacrylic acid, for example ethyl acrylate, methyl methacrylate; and combinations thereof. The homopolymers and copolymers of ethylene having an unfoamed density in the range of about 0.910 to about 0.930 gram per cc. have been found attractive for use in the invention because of their resistance to cracking or shattering under impact loads.

The first layer will generally have a foamed density in the range of about 0.25 to about 0.7 gram per cc., preferably from about 0.3 to about 0.5 gram per cc., to achieve the desired combination of absorption and diffusion or spreading of the impact force. It is presently preferred that in shock-absorbent structures to be used in athletic padding, the first layer have a compressive strength at 10 percent deflection (ASTM D1621–64T, Procedure A) in the range of about 35 to about 150 p.s.i., and more preferably in the range of about 45 to about 100 p.s.i. The semirigid foamed thermoplastic first layer can be produced in accordance with Engel, U.S. Pat. No. 3,013,298, issued Dec. 19, 1961, and Engel, U.S. Pat. No. 3,342,913 issued Sept. 19, 1967.

The second layer can be of any suitable flexible cellular rubber, for example, latex foam rubber, sponge rubber, and expanded rubber. The cellular rubber can be formed from natural rubber, reclaimed rubber, synthetic rubber or rubber-like materials, alone or in combination. Specific materials which are suitable include natural rubber, butadiene-styrene rubber, nitrile rubber, polychloroprene, chlorosulfonated polyethylene, ethylene-propylene terpolymers, butyl rubbers, polyacrylates, synthetic cis-polyisoprene, and urethane polymers, and combinations thereof. In general, the flexible cellular rubber layer will have a compressive strength at 25 percent deflection (ASTM D1055–62T, indentation test, for latex foam rubber; ASTM D1056–62T, compression-deflection test for sponge rubber and expanded rubber) in the range of about 1 to about 30 p.s.i., and preferably in the range of about 5 to about 15 p.s.i. The flexible cellular rubber will generally have a density in the range of about 0.02 to about 0.3 gram per cc. and a falling ball rebound in the range of about 1 to about 25 percent.

The combined structure is highly effective in cushioning dynamic and impact loads since the semirigid cellular first layer distributes a point load over a relatively large area of the second underlying layer, thus imparting less compressive force per unit area than is delivered at the immediate point of impact. It is believed that the semirigid cellular material absorbs some force by temporary lateral displacement of the cell walls. There is no significant straight line path in which the force is transmitted as is present in noncellular or rigid materials. The advantages of utilizing the shock-absorbent construction in such items as protective athletic equipment, padding, and the like are readily apparent.

The first and second layers of the shock-absorbent construction can be assembled or bonded so that the two layers do not change in their relative positions during use. The use of adhesives, the heat sealing of the layers together and the formation of the flexible cellular rubber material on a semirigid first layer are exemplary of suitable bonding techniques. The two layers can also be fastened together by sewn stitches or other mechanical means such as staples or rivets. It is to be understood that the construction is not limited to the inclusion of any type of bonding material or means but that the shape of the article into which such construction is to be incorporated may serve to prevent relative motion between the first and second layers.

Referring now to the drawings, FIG. 1 illustrates a shock-absorbent construction, designated by numeral 10, comprising a first layer of semirigid foamed thermoplastic material 11, a second underlying layer of flexible cellular rubbery cushioning material 12, and an adhesive bonding layer 13 to secure the layer 11 to layer 12. The relative thickness of the layers and total thickness of the shock-absorbent construction will be dependent upon the loads to be encountered and the particular application of the construction. For example, when used in athletic padding, the first semirigid layer can be about three-sixteenths inch thick while the underlying flexible cushioning material can be about three-eighths inch thick.

FIG. 2 depicts an article 20 such as a component of shoulder pads used in contact sports, having a first layer 21 of semirigid foamed thermoplastic material and a second layer 22 of flexible cellular rubber sewn together by stitching 23, as another means of securing the layers together.

EXAMPLE I

A series of runs were conducted in order to compare the impact resistance of the semirigid foamed material of the invention with that of commercially available solid thermoplastic athletic protector elements. In each run, the test element was positioned on a sheet of carbon paper overlying a sheet of white paper on a rigid base, with the carbon surface of the carbon paper being in contact with the sheet of white paper. A steel ball weighing 5 pounds was dropped from a height in vertical free fall to impact approximately at the center of the upper surface of the test element. The impact of the dart on the test element caused the formation of a carbon image on the sheet of white paper. The conditions and results are set forth below.

TABLE I

| Run | Material | Drop height, inches | Visible image diameter, inches | Percent light transmission Image | Percent light transmission Blank paper |
|---|---|---|---|---|---|
| 1 | A | 12 | 7/16 | 10-16 | 36-39 |
| 2 | B | 12 | 1 1/16 | 19-22 | 35-37 |
| 3 | A | 18 | 1/2 | 11-14 | 37-40 |
| 4 | B | 18 | 1 1/4 | 14-16 | 34-38 |
| 5 | A | 24 | 5/8 | 9-11 | 35-40 |
| 6 | B | 24 | 1 3/8 | 9-18 | 35-37 |

Each test element A was a solid shield plate from a commercially available football shoulder pad assembly, and was molded of a homopolymer of ethylene having a density of 0.961 gram per cc., with a minimum thickness of 235 mils. Each test element B was a foamed sheet of a homopolymer of ethylene having an unfoamed density of 0.917 gram per cc., the average density of the foamed sheet being 9.41 gram per cc., the compressive strength (ASTM D1621–64T, Procedure A) of the foamed sheet being about 60 p.s.i., and the thickness of the foamed sheet being 250 mils. In each of runs 1, 3 and 5 the test element shattered under the impact, whereas in runs 2, 4 and 6 the only effect on the foamed sheets was a small dent which was not visually detectable at the end of 24 hours.

The size of the carbon images in runs 2, 4 and 6 as contrasted with the size of the carbon images in runs 1, 3 and 5, respectively, illustrates the spreading of the impact force over a larger area by the foamed material. Similarly, the lighter images, as indicated by greater light transmission, in runs 2, 4 and 6 illustrate that the transmitted force per unit area is reduced with the foamed material as compared to the solid material of runs 1, 3 and 5, respectively.

EXAMPLE II

A second series of runs was conducted to compare unfoamed, low density polyethylene with and without a flexible cellular rubber backing to foamed, low density polyethylene with and without a flexible cellular rubber backing, using the procedure of example I, with steel balls of various weights. The conditions and results are set forth below.

TABLE II

| Run | Material | Weight of ball, pounds | Drop height, inches | Visible image diameter, inches | Percent light transmission Image | Percent light transmission Blank paper |
|---|---|---|---|---|---|---|
| 7 | C | 1 | 12 | 5/8 | 36-38 | 60-64 |
| 8 | C | 2 | 12 | 3/4 | 26-30 | 60-64 |
| 9 | C | 8 | 12 | 1 1/8 | 21-26 | 60-64 |
| 10 | D | 1 | 12 | 1 | 53-55 | 57-60 |
| 11 | D | 2 | 12 | 1 1/4 | 50-54 | 57-60 |
| 12 | D | 8 | 12 | 1 3/4 | 43-48 | 57-60 |
| 13 | C-R | 8 | 36 | 1 1/4 | 26-29 | 58-63 |
| 14 | D-R | 8 | 36 | 1 1/4 | 34-36 | 56-60 |
| 15 | C-R | 8 | 48 | 1 3/4 | 18-23 | 58-63 |
| 16 | D-R | 8 | 48 | 2 | 22-27 | 56-60 |

Each test element C was two layers of a solid, unfoamed sheet of a homopolymer of ethylene having a density of 0.917 gram per cc., each layer having a thickness of about 100 mils for a total thickness of about 200 mils. Each test element D was a foamed layer of a homopolymer of ethylene having an unfoamed density of 0.917 gram per cc. and a foamed density of about 0.42 gram per cc., a thickness of about 200 mils, and a compressive strength at 10 percent compression (ASTM D1621–64T, Procedure A) of about 60 p.s.i. Each test element C-R was a combination of a test element C overlying a layer of flexible cellular polyurethane. Similarly, each test element D-R was a combination of a test element D overlying a layer of flexible cellular polyurethane. In both C-R and D-R, the polyurethane layer had a thickness of about 375 mils, a foamed density of 0.135 gram per cc., a compressive strength at 25 percent depression (ASTM D1056–62T:⅜-inch thick sample disc having with depression rate of 1 inch per minute) of about 8.5 p.s.i., a falling ball rebound of about 10 percent, a Lupke rebound of about 50 percent, and a Shore A hardness of about 4.

A comparison of the image diameters of runs 7, 8 and 9 with those of runs 10, 11 and 12, respectively, indicates that the foamed polyethylene distributes an impact load over a wider area than does the unfoamed polyethylene having the same unfoamed density. Similarly, the lighter images of runs 10, 11 and 12 indicate that the transmitted force per square inch had been significantly reduced. A comparison of runs 13 and 15 with runs 14 and 16 indicates that with the composite of flexible cellular rubber and foamed polyethylene the foamed polyethylene spreads the impact force over a wider area to the extent that the force transmitted in a considerable portion of the outer area is insufficient to cause the formation of a carbon black impression on the white paper.

Reasonable variations and modifications are possible within the scope of the foregoing disclosure, the drawings and the appended claims to the invention.

That which is claimed is:

1. A shock-absorbent athletic padding structure comprising a first outer, semirigid foamed layer and a second layer in underlying contact therewith; said outer semirigid foamed layer and said second layer being assembled together to substantially prevent relative motion therebetween; said outer semirigid foamed layer being formed from a foamable, normally solid, synthetic thermoplastic polymeric material having a compressive strength at 10 percent deflection (ASTM D1621–64T, Procedure A) in the range of about 30 to about 200 p.s.i. to distribute an impact load applied against the outer surface of said first foamed layer over a wider area of said second, underlying layer as well as absorbing a portion of said impact load without shattering; and said second, underlying layer being formed of a flexible cellular rubber to absorb at least a portion of the impact load transmitted by said first foamed layer, said flexible cellular rubber having a compressive strength at 25 percent deflection (ASTM D1055–62T; ASTM D1056–62T) in the range of about 1 to about 30 p.s.i.

2. A structure in accordance with claim 1 wherein said synthetic thermoplastic polymeric material is selected from the group consisting of homopolymers of ethylene and copolymers of ethylene with at least one monomer copolymerizable therewith.

3. A structure in accordance with claim 2 wherein said first foamed layer has a density in the range of about 0.25 to about 0.7 gram per cc.

4. A structure in accordance with claim 3 wherein said synthetic thermoplastic polymeric material has an unfoamed density in the range of about 0.910 to about 0.930 gram per cc.

5. A structure in accordance with claim 1 wherein said first foamed layer has a compressive strength at 10 percent deflection (ASTM D1621–64T, Procedure A) in the range of about 35 to about 150 p.s.i.

6. A structure in accordance with claim 1 wherein said first foamed layer has a compressive strength at 10 percent deflection (ASTM D1621–64T, Procedure A) in the range of about 45 to about 100 p.s.i.

7. A structure in accordance with claim 6 wherein said first foamed layer has a density in the range of about 0.3 to about 0.5 gram per cc.

8. A structure in accordance with claim 7 wherein said synthetic thermoplastic polymeric material is selected from the group consisting of homopolymers of ethylene and copolymers of ethylene with at least one monomer copolymerizable therewith.

9. A structure in accordance with claim 8 wherein said synthetic thermoplastic polymeric material has an unfoamed density in the range of about 0.910 to about 0.930 gram per cc.

10. A structure in accordance with claim 9 wherein said synthetic thermoplastic polymeric material is polyethylene and wherein said rubber is polyurethane.

11. A structure in accordance with claim 1 wherein said first layer is bonded to said second, underlying layer.

12. A structure in accordance with claim 1 wherein said first layer is mechanically fastened to said second, underlying layer.